SAFETY SKI BINDING
Original Filed Feb. 28, 1969
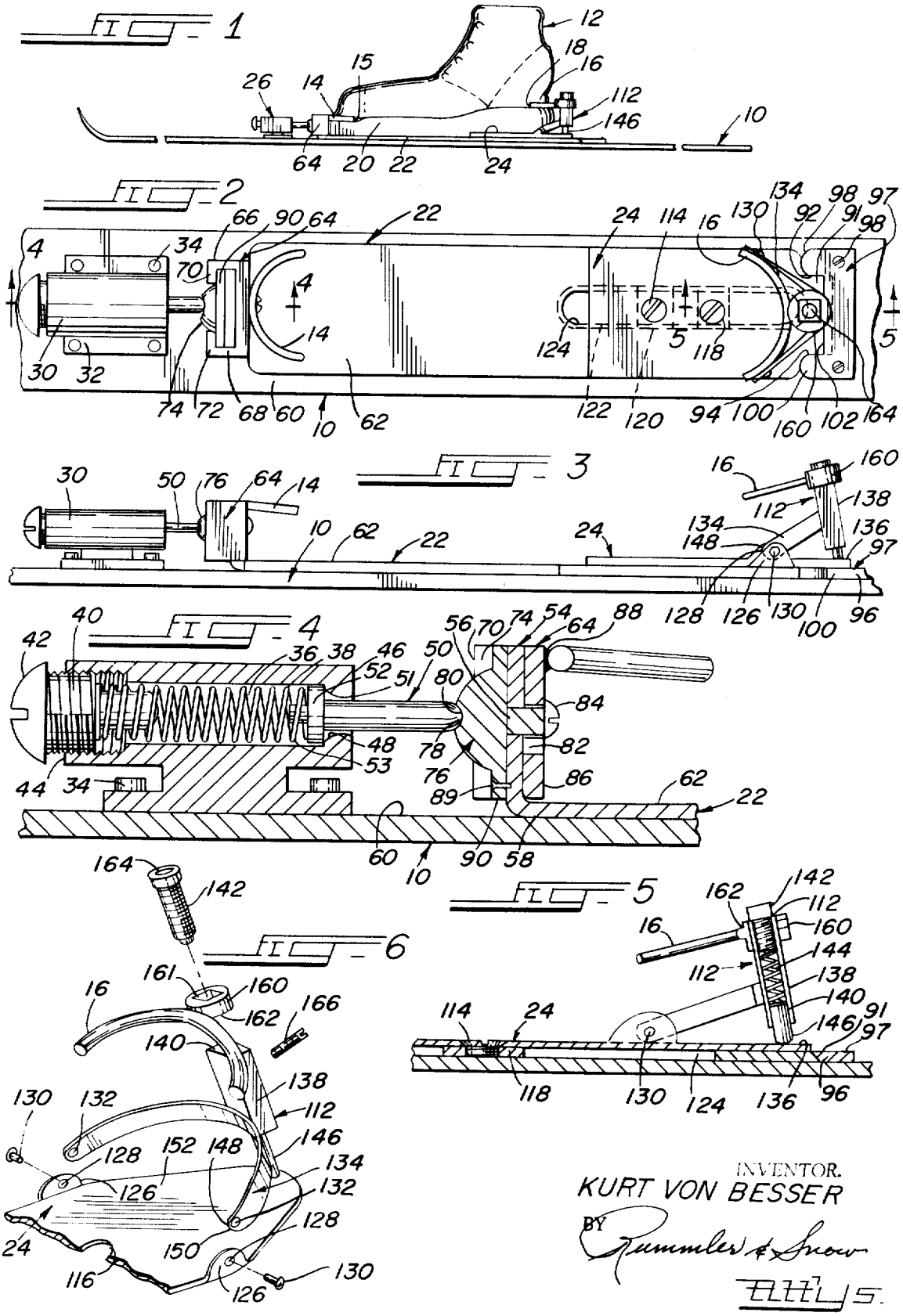
INVENTOR.
KURT VON BESSER
BY Rummler & Snow
ATTYS.

United States Patent Office

Re. 27,991
Reissued Apr. 30, 1974

27,991
SAFETY SKI BINDING

Kurt von Besser, Chicago, Ill., assignor to
Safety Systems, Inc.

Original No. 3,492,014, dated Jan. 27, 1970, Ser. No. 712,892, Feb. 28, 1968. Application for reissue Jan. 5, 1972, Ser. No. 215,618
Int. Cl. A63c *9/00*
U.S. Cl. 280—11.35 K 34 Claims

Matter enclosed in heavy brackets [ ] appears in the original patent but forms no part of this reissue specification; matter printed in italics indicates the additions made by reissue.

ABSTRACT OF THE DISCLOSURE

A safety ski binding for releasably securing a boot to a ski, including in one embodiment a sole plate, a spring biased abutment for retaining the toe end of the sole plate to the ski, an undercut bracket to releasably hold the heel end of the sole plate to the ski, an adjustable heel plate on the sole plate, a hinged arcuate back plate on the heel plate carrying an adjustably mounted boot heel retainer and a spring-actuated pin biasing the heel retainer about the axis of the hinged back plate against the heel groove of the boot. In one embodiment the biasing pin is contained in a housing affixed to the back plate so that the pin impinges against the heel plate in all of its positions and any forces, beyond those of ordinary skiing, releases the heel and toe of the boot. The housing has an aperture in its top to be engaged by the point of a ski pole, forming a lever by which the bracket can be moved against the biasing pin for emergency release of the boot by a skier.

BACKGROUND OF THE INVENTION

A number of different designs of releasable ski binders are known. These devices are used to protect the skier against injury resulting from the ski striking an object in the snow or the skier falling in any direction from the skis. These devices are intended to securely fasten the ski boot to the ski against all ordinary acts of skiing and to lateral twisting, forward or rearward movement or force release the boot from the ski when there is abnormal between the boot and the ski. This type of protection is particularly necessary to counteract the excessive forces which occur in the legs or ankles when the skier suffers a forward fall. To accomplish this result, the prior art devices depend upon such expedients as rupture keys, compressional forces applied to spring-biased ball bearings held between apertured plates, special fittings affixed to the boot, overriding cam and lever members and the like.

Although the prior art constructions generally meet their objectives, too often there is a failure to remember that the primary objective of a ski binder is to hold the ski boot firmly to the ski and that there are unforeseen or counteracting frictional forces that arise in the cable guides, sliding members, telescoping members etc., to the extent that the binding does not hold, gives an uneasy or soft feel to the skier because of too much resilience, offers difficulty in adjustment, or, in case of an emergency, the binding does not properly release the boot. Many prior art bindings have only one degree of freedom for release upon being subjected to an overload, and require that two different bindings be coupled together. Generally, the binding for the heel of the boot is designed to open on a vertical over-strain while the binding for the toe of the boot is designed to open upon being subjected to a horizontal torsional load. In some instances, the bindings are of heavy construction, are not balanced because of adjustable side members or levers, and require special fittings or attachments for the boot. It is highly advantageous to provide a binding which fits any boot and takes into account the variations in sizes of boots, variations in the shapes of individual boots of a hand-made pair and also can be used with boots of different design or which may be misshapen due to hard use and the effects of repeated wetting and drying. Furthermore, it is advantageous to provide a ski binding which is easy to attach to a boot, easily adjusted, easily removed from the boot and is of simple fool-proof construction.

It is accordingly the objects of this invention to provide a ski binding which avoids these drawbacks; to provide a ski binding which correctly releases from both the ski and the boot almost simultaneously so that in an emergency the assurance against injury to the skier's legs and ankles is made more certain; to provide a ski binder which is of simple design, having enclosed parts which do not freeze up with encrusted snow and can be quickly released by hand with the point end of the ski pole, if desired.

SUMMARY OF THE INVENTION

The instant invention concerns a safety ski binding for releasably securing a boot to a ski wherein the entire sole plate with the ski boot attached is freed from the ski under abnormal conditions and in the case of any type of fall by the skier, any movement of the boot causes it release. Also any forces against the toe allow the sole plate to be freed of the ski and the resilient heel retainer becomes responsive to forward forces to release the boot from the sole plate. These actions are accomplished sequentially or simultaneously by having the sole plate mounted for quick release by a wobble-mounted detent pin at the toe end, whereby the boot and sole plate are immediately released from the ski under any type of force.

DESCRIPTION OF THE DRAWINGS

FIG. 1 is a side elevational view of a boot and binding mounted to a ski in accordance with this invention;

FIG. 2 is an enlarged top plan view of a ski binding constructed in accordance with this invention;

FIG. 3 is a fragmentary side elevational view of ski binding shown in FIG. 2;

FIG. 4 is a partial cross-sectional view taken along the lines 4—4 of FIG. 2 of the toe and sole plate hold-down means constructed in accordance with this invention;

FIG. 5 is a partial cross-sectional view taken along the lines 5—5 of FIG. 2 of the heel attachment means on the sole plate constructed in accordance with this invention; and FIG. 6 is an exploded view of the parts shown in FIG. 5.

THE PREFERRED EMBODIMENT

Referring to FIG. 1 there is shown a ski 10 with a ski boot 12 attached thereto by means of the binder of this invention having a toe retainer ring 14 engaged within the front groove 15 about the toe of the boot 12 and the heel retainer ring 16 engaged within the rear groove 18 about the heel of the boot. The sole 20 of the boot rests upon the sole plate 22 and the heel is carried by the heel plate 24.

At the toe end of the binder there is a spring-biased means 26 comprising a housing 30 integral with a base 32 held firmly to the ski 10 by means of the screws or bolts 34. The housing 30 has a longitudinal bore 36 which forms a guide for the coil spring 38 of the compression type. The bore 36 has an enlarged threaded end section 40, the threads of which are engaged by the adjusting screw 42 having a central shaft portion 44 which is encompassed by the last few turns of the spring 38 and may be separable to integral therewith. The rearward end of the housing 30 has a radial flange 46 defining a smaller end bore 48 which carries the detent 50. The end bore 48 has an inwardly and outwardly flared surface 51. The detent 50 has a base or enlarged portion 52, which is slidably engaged by the bore 36, and of slightly lesser diameter so that the detent 50 is guided in a wobble motion along the axis of the bore hole. The outermost part of the end bore 48 forms a fulcrum for the detent 50 in its sliding and wobble relationship. These parts may be coated with a suitable cold weather lubricant or the housing can be made of nylon to provide a self-lubricating housing. Also nylon sleeves may be provided in the bores 36 and 48 to provide smooth working surfaces. A central shaft 53 is provided, integral with the base 52 to serve as a guide in assembly of the unit.

The detent 50, as shown in FIG. 4, is in its tension position, there being no ski boot in the binding. With a ski boot in the binding as shown in FIG. 1, the base 52 of the detent 50 will assume the same position along the bore 36 with the spring 38 as it is under sufficient compression to hold the sole plate 22 and the toe of the boot in place during ordinary skiing activities.

The sole plate 22 has an upturned ear member 54 which is of lesser width than the sole plate and has a threaded aperture 56 extending therethrough. The juncture 58 between the bottom of the sole plate and the top 60 of the ski 10 is an area of sliding contact during the releasing functions of this device. Other areas such as the surface 62 of the sole plate 22 may be of non-skid surfaces. A U-shaped bracket member 64 is provided with a pair of spaced opposed side walls 66 and 68 having at the forward side the flanges 70 and 72 defining an opening 74 therebetween.

The bracket 64 is dimensioned so as to receive the ear member 54 along with the socket member 76 having a forward facing recess 78 axially aligned with the rounded tip 80 of the detent 50. The bracket 64 has a vertical slot 82 adapted to receive the machine screw 84, the head of which is larger in diameter than the width of the slot 82. The extended end of the screw 4 engages the threaded aperture 56 in the ear member 54. The rear side wall 86 of the bracket 64 carries the arcuate rod-like toe retainer ring 14 affixed thereto in any desired manner, as by means of the weld 88. The retainer ring 14 is held at a slight downward angle in relation to the plane surfaces 60 and 62 of the ski and sole plate. The socket member 76 is held to the ear member 54 by means of screws 89 which extend through countersunk holes in the edges of the flange 90 which is an integral part thereof. It is seen by this construction that the vertical height of the socket 76 is fixed in relation to the detent 50 so that these parts are always in proper alignment and that the screw 84 and the slot 82 allow slight vertical adjustment of the bracket 64 and the retainer ring 14 in relation to the sole plate 22. The flanges 70 and 72 are in sliding engagement upon the peripheral flange 90.

The rearward end of the sole plate 22 has a protuberance or tab 91 of lesser width than the sole plate and having the straight side walls 92 and 94, with a rearward edge 96 (FIGS. 3 and 5) which is scived or chamfered rearwardly. A rear base plate 97 is affixed to the ski by means of the screws or bolts 98 and is provided with a pair of forwardly-directed lobes 98 and 100 with rounded edges that act as guides for the insertion of the tab member 91 therein and also provide lateral support in both directions across the ski by their close-fitting engagement with the sides 92 and 94 of the tab member 91. The inner edge 102 of the base plate 97 is scived parallel to the scived edge or surface 6 of the tab member 91 so that these two surfaces are in opposed contact when the sole plate is affixed between the base plate 97 and the toe retainer 26. It is seen from this construction that with the sole plate in the position shown in FIG. 2 the main holding force is between the detent 50 and the matching scived edges 96 and 102 and sufficient lateral spacing is provided between the edges 92 and 94 and the lobes 98 and 100 so that any directional force against the toe end of the sole plate will free same from the ski.

The binding of this invention includes the heel plate 24 which rests upon the sole plate 22 and carries the heel retainer ring 16 by means of the quick release means 112. The position of the heel plate 24 can be adjusted longitudinally along the sole plate by means of a pair of screws 114, which pass through the countersunk holes 116 (FIG. 6) in the heel plate, and engage the clips or cleats 118 thereunder, having the beveled edges 120 which engage the scived or undercut edges 122 of the longitudinal slot 124. As shown in FIG. 5 the heads of the screws 114 are flush with the top of the heel plate and the thickness of the cleats 118 is about the same as or less than the depth of the slot 124 so that upon loosening the screws the heel plate can be moved to a desired adjustment to accommodate different size boots within the limits of the length of the slot 124.

The heel plate 24 has a pair of outstanding ears 126 with the holes 128 therethrough adapted to receive the rivets 130 and engage the holes 132 of the arcuate heel band 134. The back portion of the heel plate 24 may be square or tapered, as shown at 136, to extend beyond the radius of swing of the heel band 134. Centrally of the heel band 134 there is affixed the quick release means 112 comprising a housing 138 which has an irregular or square outer configuration defined by its outer walls and an inner bore hole 140, threaded at the top to receive the adjusting screw 142. The bore also has the coil spring 144 and the biasing pin 146, which is normally retained in the bore 140 by the relative positions of the parts. Thus, the heel band 134 has rounded points 148 and also lower edges 150 which are shaped in spaced relationship from the top surface 162 of the heel plate 2 to allow pivotal movement of the heel band.

The heel retainer ring 16 is affixed to the collar 160, as by means of the weld 162, and is carried at a slight downward angle. The collar 160 has a central aperture 161 conforming with the outer configuration, i.e., square shape of the housing 138 so that it will slide up and down thereon, but not rotate, and thus form a rigid mounting for the retainer ring. The adjusting screw 142 has a bore hole 164 in the top end to receive the pointed end of a ski pole to form an elongated lever therewith. An Allen screw 166 or the like on the back side of the collar 160 serves to hold same at the desired height against the housing 138.

The operation of the ski binding of this invention is as follows: The screws 114 are loosened and the heel plate 24 is moved to a position allowing the ski boot to be engaged between the rings 14 and 16 for initial setting for a definite size ski boot. When this is determined the nuts 142 are tightened. Now the toe of the boot is inserted in place so that the ring 14 lies on the offset on the front of the boot. The member 138 is moved rearwardly to allow the heel of the boot to seat on the heel plate. This can be done by placing the tip of the ski pole in the bore 164 and move the ski pole rearward about pivots 130, thus clearing the way for the heel of the boot to be positioned on the heel plate 24. Thus when releasing the rearward pressure the heel ring will be positioned on the offset portion of the heel. Any tightening of the screw 42 against the spring 38 changes the pounds pressure of the end 78 of the detent against the seat 78.

With the boot 12 so attached it is seen that any abnormal thrust will allow the sole plate 22 to slide forward against the detent 50 enough to allow the scived edges 96 and 102 of the sole plate 22 and base plate 97 to clear, and the entire boot and sole plate are free of the ski. Once the device of this invention is adjusted for a given size of boot it is only necessary for the skier to step into the binder, press the toe into and against the toe ring 14, place the tip end of a ski pole into the bore 164, move the ski pole in a pivotal movement backward to depress the quick release means 112 downward against the biasing pin 146 and slip the heel groove 18 into the place before the heel ring 16. Release and removal of the ski pole allows the quick release means 112 to engege the heel of the ski boot and the boot is securely mounted in the binding.

It is apparent from the description that the rounded edges 148 on the heel band 134 prevent counter-clockwise rotation of the heel bend 134 and quick release 112 on the pins 130 beyond the relationship shown in FIG. 3 so that the biasing pin 146 stays within the housing 138. The biasing pin 146 can be otherwise retained within the housing 138. The ski binder of this invention is adapted for use with a ski boot of ordinary construction having off-set toe and heel portions, such as the grooves 15 and 18, respectively.

It is to be understood that the end bore 48 as shown in FIG. 4 may also be a straight line bore whereby all thrust of the pintle is axial only. Thus any abnormal thrust will cause the end 80 to pop out of the seat 78.

What is claimed is:

1. A ski binder mounted on a ski blade for releasably securing a ski boot thereto, said boot having a sole with off-set and heel portions thereon, comprising:

(a) a sole plate on said ski blade;
(b) said sole plate having a bracket member affixed to the toe end thereof;
(c) means on said bracket member to engage the off-set toe portion of the sole of said boot; and means affixed to said ski blade to releasably hold said bracket member thereto comprising;
(d) a spring biased detent mounted in a housing on said ski blade;
(e) an upright ear member is provided integral with the toe end of said sole plate;
(f) a socket member is affixed to said upright ear member in operable relationship with said detent; and
(g) said bracket member has a flanged opening encompassing said ear member and said socket member; and
(h) means are provided to affix said bracket member at desired heights from said sole plate along said flanges;
(i) a heel end on said sole plate;
(j) a base plate affixed to said ski blade and having recess means to receive said heel end of said sole plate;
(k) said means affixed to said ski blade to releasably hold said bracket member thereto and serving bias said heel end into the recess of said base plate;
(l) an arcuate heel band substantially encompassing the heel portion of said boot sole;
(m) means to pivotally mount said heel band on an axis transverse said ski blade;
(n) means on said heel band to engage the off-set heel portion of the boot sole; and
(o) means biasing said heel band about said pivot.

2. A ski binder in accordance with claim 1 in which:

(a) said spring biased detent extends from a bore hole in said housing;
(b) said bore hole having a beveled surface encompassing said detent whereby the extended end of said detent is wobble-mounted therein and is responsive to release from said bracket member under any abnormal thrust.

3. A ski binder in accordance with claim 1 in which said means to bias and engage the off-set heel portion of said ski boot comprises:

(a) a vertical housing mounted on said heel band;
(b) a pin within said housing and extending from the bottom thereof;
(c) means in said housing urging said pin against said sole plate.

4. A ski binder in accordance with claim 3 in which:

(a) means are provided to adjust the bias of said pin against said slidable mounting; and
(b) said pin bears on a heel plate slidably mounted on said sole plate.

5. A ski binder in accordance with claim 3 in which:

(a) a collar is slidably and nonrotatably mounted on said vertical housing;
(b) means are provided to affix said collar at desired heights on said housing; and
(c) said means to engage said heel portion of said ski boot is affixed to said collar.

6. A ski binder in accordance with claim 1 wherein:

(a) said spring biased detent extends from a bore hole in said housing;
(b) said bore hole encompassing a portion of the rear of said detent, whereby the extended end of said detent moves only in an axial plane and is responsive to release from the bracket member under any abnormal thrust.

*7. A ski binding mountable on a ski blade for releasably securing thereto a ski bot having a sole with offset toe and heel portions, comprising:*

*sole plate means releasably securable to both the ski blade and ski boot and having on opposite ends thereof toe securing means and heel securing means,*
*said toe securing means including*
*an upright ear member integral with and extending upward from the sole plate means,*
*socket means defining a socket located on said upright ear member,*
*bracket means to engage the offset toe portion of the sole of said ski boot,*
*adjustment means for affixing said bracket means at different heights from said sole plate means and for locking said bracket means to said upright ear member at a desired height, including an adjustable element facing and blocked by the offset toe portion of the ski boot and movable when the offset toe portion is not engaged by the bracket means to release the bracket means for movement to different heights,*
*said heel securing means including*
*arcuate means pivotally mounted to said sole plate means at spaced points on an axis transverse to said ski blade,*
*retainer means on said arcuate means for engaging the offset heel portion of the sole of said ski boot to releasably secure the ski boot on the sole plate means;*
*toe release means mountable to said ski blade to releasably hold said toe securing means thereto including*
*spring biased detent means having a movable member engaging said socket means, and housing means for said spring biased detent means; and*
*heel release means mountable to said ski blade to releasably hold said heel securing means thereto.*

*8. The ski binding of claim 7 wherein said bracket means has an opening therethrough, and said adjustment element extends through said opening to lock said bracket means to said upright ear member.*

*9. The ski binding of claim 8 wherein the opening in said bracket means comprises a verticaly extending slot, said adjustment means comprises threaded aperture means in said toe securing means and screw means corresponding to said adjustable element and having head means larger than the width of said vertically extending slot and body means extending from said head means into said threaded aperture means, said head means being rotatable to release said bracket means for vertical movement within said verticaly extending slot and to clamp said head means against said bracket means to lock said bracket means at the desired height.*

*10. A ski binding mountable on a ski blade for releasably securing thereto a ski boot having a sole with offset toe and heel portions, comprising:*

*sole plate means releasably securable to both the ski blade and the ski boot and having on opposite ends thereof toe securing means and heel securing means,*

*toe release means mountable to said ski blade to releasably hold said toe securing means thereto including*

*spring bised detent means having a movable member and housing means for said spring biased detent means;*

*heel release means mountable to said ski blade to releasably hold said heel securing means thereto;*

*said toe securing means including*

*an upright ear member integral with an extending upward from the sole plate means,*

*a socket member separate from said upright ear member and having a forward facing concave recess formed therein, and means securing said socket member to said upright ear member for axial alignment of the concave recess with the movable member which engages the socket member,*

*bracket means to engage the offset toe portion of the sole of said ski boot,*

*adjustment means for affixing said bracket means at different heights from said sole plate means and for locking said bracket means to said upright ear member at a desired height,*

*said heel securing means including*

*arcuate means pivotally mounted to said sole plate means at spaced points on an axis transverse to said ski blade,*

*retainer means on said arcuate means for engaging the offset heel portion of the sole of said ski boot to releasably secure the ski boot on the sole plate means.*

*11. The ski binding of claim 10 wherein said socket member includes a pair of spaced, extending side walls, and said toe securing means includes spaced, extending surface means abutting said side walls.*

*12. The ski binding of claim 10 wherein said socket member having the forward facing concave recess has rounded inward side walls, said housing means includes a bearing hole through which said movable member extends into engagement with said concave recess, said housing means includes means restricting said movable member for movement only in an axial direction paralell with said ski blade, the rounded side walls of said concave recess causing said movable member to axially retract into said housing means when abnormal thrust causes said sole plate means to move with respect to said ski blade.*

*13. The ski binding of claim 10 wherein said heel release means comprises base plate means fixedly mountable to said ski blade and having recess means to receive a heel end of said sole plate means, said spring biased detent means serving to bias said sole plate means rearwardly to urge said heel end into the recess means of said base plate means.*

*14. The ski binding of claim 10 wherein said retainer means includes spring means for biasing said retainer means against said offset heel portion of the sole of said ski boot to securely retain the ski boot on the sole plate means.*

*15. The ski binding of claim 14 wherein said retainer means includes means movable to adjust the bias of said spring bias means.*

*16. The ski binding of claim 14 wherein said heel securing means includes sole length adjust means movable to adjust the position of said retainer means along an axis parallel to said ski blade.*

*17. The ski binding of claim 10 wherein said retainer means has a heel bracket means centrally located on said arcuate means and extending therefrom for engaging the offset heel portion of the sole of said ski boot, said arcuate means comprises a pair of leg members oppositely extending from said centrally located heel bracket means and each pivotally mounted to said sole plate at said spaced points, and sole length adjust means for axially moving said heel bracket means on an axis parallel with and centered on said ski blade.*

*18. A ski binding mountable on a ski blade for releasably securing thereto a ski boot having a sole with offset toe and heel portions, comprising:*

*sole plate means releasably securable to both the ski blade and the ski boot and having on opposite ends thereof toe securing means and heel securing means;*

*said toe securing means including*

*means secured to said sole plate means for engaging the offset toe portion of the sole of said ski boot;*

*said heel securing means including*

*arcuate means pivotally mounted to said sole plate means at spaced points on an axis transverse to said ski blade,*

*retainer means on said arcuate means for engaging the offset heel portion of the sole of said ski boot to relasably secure the sole of the ski boot on the sole plate means;*

*one of said securing means further including*

*an upright ear member extending upward from the sole plate means, and*

*a socket member separate from said upright ear member and having a concave recess having rounded inward side walls;*

*toe release means and heel release means mountable to said ski blade to respectively releasably hold said toe securing means and said heel securing means thereto,*

*one of said release means including*

*spring biased detent means having a movable member with a rounded tip;*

*means securing said socket member to said upright ear member for axial alignment of the concave recess with the rounded tip of said movable member;*

*said one release means further including housing means for said spring biased detent means and including a bearing hole through which said movable member extends with said rounded tip abutting said concave recess, surface means restricting said movable member for movement only in an axial direction parallel with said ski blade,*

*the rounded side walls of said concave recess being urged against said rounded tip to force the movable member to axially retract into said housing means when abnormal thrust causes said sole plate means to move with respect to said ski blade.*

*19. The ski binding of claim 18 wherein said movable member comprises an elongated shaft with said rounded tip being external to said housing means and said shaft having base means internally located within said housing means, said surface means comprises a portion of said bearing hole which encompasses said shaft to restrain the shaft for slidable movement only in said axial direction, and spring means located with said housing means and extending against said base means to maintain said rounded tip against said concave recess under normal thrust and to release said socket means under any abnormal thrust.*

*20. The ski binding of claim 18 wherein said socket member includes a pair of spaced walls, and said one securing means includes spaced surface means abutting said spaced walls of said socket member.*

*21. The ski binding of claim 18 wherein said rounded inward side walls define an arcuate curve having along at least one extent a diameter greater than the diameter of said rounded tip.*

*22. The ski binding of claim 18 wherein said one securing means corresponds to said toe securing means, said toe engaging means comprises bracket means secured to said upright ear member, and said toe securing means includes adjustment means for affixing said bracket means at different heights from said sole plate means and for*

*locking said bracket means to said upright ear member at a desired height.*

*23. The ski binding of claim 22 wherein said bracket means has therein a vertically extending slot, said adjustment means comprises screw means having head means greater that the width of said vertically extending slot and body means extending from said head means and through said slot, said head means being adjustable to release said bracket means for vertical movement within said slot and to clamp said head means against said bracket means to lock said bracket means at the desired height.*

*24. The ski binding of claim 18 wherein the other of said release means comprises base plate means fixedly mountable to said ski blade and having recess means to receive an end of said sole plate means, said spring biased detent means serving to bias said sole plate means to urge said end into the recess means of said base plate means.*

*25. The ski binding of claim 18 wherein said retainer means includes spring means for biasing said retainer means against said offset heel portion of the sole of said ski boot to securely retain the ski boot on the sole plate means.*

*26. The ski binding of claim 18 wherein said retainer means comprises heel bracket means centrally located on said arcuate means and extending therefrom for engaging the offset heel portion of the sole of said ski boot, said arcuate means comprises a pair of leg members oppositely extending from said centrally located heel bracket means and each pivotally mounted to said sole plate at said spaced points, and sole length adjust means for axially moving said heel bracket means on an axis parallel with and centered on said ski blade.*

*27. The ski binding of claim 18 wherein said rounded inward side walls of said concave recess curvilinearly extend outward from a bottom portion against which said rounded tip abuts during normal thrust to a peak portion, said socket means further defining an outer surface spaced from said concave recess and curvilinearly extending inward from said peak portion to allow said rounded tip to pop out of the concave recess to thereby release said one securing means from retention by said movable member.*

*28. A ski binding mountable on a ski blade for releasably securing thereto a ski boot having a sole with offset toe and heel portions, comprising:*

*sole plate means releasably securable to both the ski blade and the ski boot and having on opposite ends thereof toe securing means and heel securing means,*

*said toe securing means including*

*an upright ear member integral with and extending upward from the sole plate means,*

*socket means defining a socket located on said upright ear member,*

*bracket means to engage the offset toe portion of the sole of said ski boot,*

*adjustment means for affixing said bracket means at different heights from said sole plate means and for locking said bracket means to said upright ear member at a desired height,*

*said heel securing means including*

*arcuate means pivotally mounted to said sole plate means at spaced pivot points on an axis transverse to said ski blade,*

*first adjust means allowing movement of the spaced pivot points to move the arcuate means along an axis parallel to the sole plate means,*

*retainer means on said arcuate means and having an offset bracket for engaging the offset heel portion of tne sole of said ski boot to releasably secure the ski boot on the sole plate means,*

*second adjust means allowing movement of the offset bracket with respect to the spaced pivot points;*

*toe release means mountable to said ski blade to releasably hold said toe securing means thereto including*

*spring biased detent means having a movable member engaging said socket means, and housing means for said spring biased detent means; and*

*heel release means mountable to said ski blade to releasably hold said heel securing means thereto.*

*29. The ski binding of claim 28 wherein said retainer means includes means for biasing said offset bracket against said offset heel portion of the sole of said ski boot to securely retain the ski boot on the sole plate means.*

*30. The ski binding of claim 28 wherein said offset bracket of said retainer means is centrally located on said arcuate means and extends therefrom for engaging the offset heel portion of the sole of said ski boot, said arcuate means comprises a pair of leg members oppositely extending from said centrally located offset bracket and each pivotally mounted to said sole plate at said spaced pivot points, said first adjust means forming a sole length adjust for axially moving said offset bracket on an axis parallel with and centered on said ski blade.*

*31. The ski binding of claim 28 wherein said bracket means has a vertically extending slot, and said adjustment means comprises a threaded aperture in said toe securing means and a screw having a head larger than the width of said vertically extending slot and a body extending from said head into said threaded aperture, said head being rotatable to release said bracket means for vertical movement within the vertically extending slot and to clamp said head against said bracket means at the desired height.*

*32. A ski binding mountable on a ski blade for releasably securing thereto a ski boot having a sole with offset toe and heel portions, comprising:*

*sole plate means releasably securable to both the ski blade and the ski boot and having on opposite ends thereof toe securing means and heel securing means;*

*said toe securing means including*

*means secured to said sole plate means for engaging the offset toe portion of the sole of said ski boot;*

*said heel securing means including*

*arcuate means pivotally mounted to said sole plate means at spaced pivot points on an axis transverse to said ski blade,*

*first adjust means allowing movement of the spaced pivot points to move the arcuate means along an axis parallel to the sole plate means,*

*retainer means on said arcuate means and having an offset bracket for engaging the offset heel portion of the sole of said ski boot to releasably secure the sole of the ski boot on the sole plate means,*

*second adjust means allowing movement of the offset bracket with respect to the spaced pivot points;*

*one of said securing means further including*

*an upright ear member extending upward from the sole plate means, and*

*socket means located on said uprignt ear member and defining a concave recess having rounded inward side walls;*

*toe release means and heel release means mountable to said ski blade to respectively releasably hold said toe securing means and said heel securing means thereto,*

*one of said release means including*

*spring biased detent means having a movable member with a rounded tip,*

*housing means for said spring biased detent means and including a bearing hole through which said movable member extends with said rounded tip abutting said concave recess, surface means restricting said movable member for movement only in an axial direction parallel with said ski blade,*

*the rounded side walls of said concave recess being urged against said rounded tip to force the movable member to axially retract into said housing means when abnormal thrust causes said sole plate means to move with respect to said ski blade.*

*33. The ski binding of claim 32 wherein said socket means comprises a socket member separate from said up-*

*right ear member and having said concave recess formed therein, and means securing said socket member to said upright ear member for axial alignment of the concave recess with the rounded tip of said movable member.*

*34. The ski binding of claim 32 wherein said offset bracket of said retainer means is centrally located on said arcuate means and extends therefrom for engaging the offset heel portion of the sole of said ski boot, said arcuate means comprises a pair of leg members oppositely extending from said centrally located offset bracket and each pivotally mounted to said sole plate at said spaced pivot points, said first adjust means axially moving said offset bracket on an axis parallel with and centered on said ski blade.*

References Cited

The following references, cited by the Examiner, are of record in the patented file of this patent or the original patent.

UNITED STATES PATENTS

| | | | |
|---|---|---|---|
| 3,489,424 | 1/1970 | Gertsch et al. | 280—11.35 K |
| 2,094,667 | 10/1937 | Parish | 280—11.35 |
| 2,614,858 | 10/1952 | Pierce | 280—11.35 |
| 2,616,714 | 11/1952 | Cubberley | 280—11.35 |
| 2,667,359 | 1/1954 | Goodman | 280—11.35 |
| 2,705,150 | 3/1955 | Hansen | 280—11.35 |
| 3,241,849 | 3/1966 | Bodycomb | 280—11.35 |

FOREIGN PATENTS

| | | | |
|---|---|---|---|
| 215,870 | 6/1961 | Austria. | |
| 1,190,118 | 3/1959 | France. | |
| 1,337,872 | 8/1963 | France. | |
| 17,077 | 2/1904 | Sweden. | |
| 185,701 | 3/1937 | Switzerland. | |
| 623,449 | 7/1961 | Italy | 280—11.35 T |

DAVID SCHONBERG, Primary Examiner

M. L. SMITH, Assistant Examiner